(12) United States Patent  
Taheri et al.

(10) Patent No.: US 9,116,370 B2
(45) Date of Patent: Aug. 25, 2015

(54) LIQUID CRYSTAL LIGHT VARIABLE DEVICE

(71) Applicant: ALPHAMICRON INCORPORATED, Kent, OH (US)

(72) Inventors: Bahman Taheri, Shaker Heights, OH (US); David Baker, Cuyahoga Falls, OH (US); Elliott Bardun, Stow, OH (US); Tamas Kosa, Hudson, OH (US); Ludmila Sukhomlinova, Kent, OH (US); Paul Luchette, Kent, OH (US)

(73) Assignee: ALPHAMICRON INCORPORATED, Kent, OH (US)

( * ) Notice: Subject to any disclaimer, the term of this patent is extended or adjusted under 35 U.S.C. 154(b) by 128 days.

(21) Appl. No.: 13/889,209

(22) Filed: May 7, 2013

(65) Prior Publication Data

US 2014/0226096 A1    Aug. 14, 2014

Related U.S. Application Data

(60) Provisional application No. 61/763,878, filed on Feb. 12, 2013.

(51) Int. Cl.
*G02F 1/133* (2006.01)
*G02F 1/137* (2006.01)
*G02C 7/10* (2006.01)

(52) U.S. Cl.
CPC ............ *G02F 1/13306* (2013.01); *G02C 7/101* (2013.01); *G02F 1/13718* (2013.01); *G02F 1/13725* (2013.01); *G02F 1/13737* (2013.01)

(58) Field of Classification Search
CPC ............ G02F 1/13725; G02F 1/13475; G02F 1/13306; G02F 1/133504; G02F 1/13737; G02F 2203/03; G02F 2203/04; G02F 2001/13347; G02F 2001/13756; C09K 19/60; C09K 19/42; E06B 9/24; E06B 2009/2464; E06B 3/6722
USPC ..................... 349/33, 123, 165, 187, 35, 169; 252/299.01, 299.1; 428/1.1
See application file for complete search history.

(56) References Cited

U.S. PATENT DOCUMENTS 3,499,112 A    3/1970 Heilmeier et al.
3,551,026 A   12/1970 Heilmeier et al.

(Continued)

FOREIGN PATENT DOCUMENTS

WO    WO 2008/155767 A2    12/2008    ............... G02B 5/20

OTHER PUBLICATIONS

Kai, et al., "Pattern Forming Instability in Homeotropically Aligned Liquid Crystals", The Journal of Physical Chemistry 100, Aug. 15, 1996, pp. 1-10.

(Continued)

*Primary Examiner* — Thoi Duong
(74) *Attorney, Agent, or Firm* — Renner Kenner Greive Bobak Taylor & Weber

(57) ABSTRACT

Provided is a liquid crystal light variable device having a liquid crystal cell, comprising a mixture of a liquid crystal material and one or more dichroic dyes interposed between a first and a second substrate, each substrate having a conductive layer disposed thereon. The device further includes a voltage supply or controller coupled with the conductive layers for application of a voltage waveform across the liquid crystal cell. The liquid crystal cell is configured so that based on the voltage waveform applied, the device transitions between a low-haze low-tint state ("clear state"), a low-haze high-tint state ("tinted state"), and a high-haze high-tint state ("opaque state"). The high-haze state is caused by dynamic scattering in the liquid crystal-dye mixture.

20 Claims, 10 Drawing Sheets

(56) References Cited

U.S. PATENT DOCUMENTS

| | | | |
|---|---|---|---|
| 4,530,572 A | | 7/1985 | Huffman |
| 4,664,479 A | | 5/1987 | Hirishi |
| 5,172,256 A | * | 12/1992 | Sethofer et al. ............. 349/14 |
| 5,327,271 A | | 7/1994 | Takeuchi et al. |
| 5,453,863 A | * | 9/1995 | West et al. .................. 349/35 |
| 6,239,778 B1 | | 5/2001 | Palffy-Muhoray et al. |
| 6,493,128 B1 | | 12/2002 | Agrawal et al. ............. 359/265 |
| 6,927,765 B1 | * | 8/2005 | Masazumi et al. ........... 345/204 |
| 7,550,094 B2 | | 6/2009 | Jeng et al. |
| 7,754,295 B2 | | 7/2010 | Chari et al. |
| 8,068,199 B2 | | 11/2011 | Ishitani |
| 2004/0070699 A1 | | 4/2004 | Miyachi et al. ............. 349/43 |
| 2005/0007506 A1 | | 1/2005 | Faris et al. .................. 349/16 |
| 2008/0246900 A1 | | 10/2008 | Taheri et al. ................ 349/58 |
| 2009/0204207 A1 | | 8/2009 | Blum et al. .................. 623/4.1 |
| 2010/0039595 A1 | * | 2/2010 | Hayashi et al. ............. 349/123 |
| 2012/0038841 A1 | | 2/2012 | Taheri et al. |

OTHER PUBLICATIONS

Kai, et al., "Successive Transitions in Electrohydrodynamic Instabilities of Nematics", Progress of Theoretical Physics Supplement, No. 64, 1978, pp. 1-32.

Kai, et al., "Pattern Dynamics in the Electrohydrodynamics of Nematic Liquid Crystals", Progress of Theoretical Physics Supplement, No. 99, 1989, pp. 1-35.

Heilmeier, et al., "Dynamic Scattering in Nematic Liquid Crystals", Applied Physics Letters, vol. 13, No. 1, Jun. 10, 1968, pp. 1-2.

Heilmeier, et al., "Dynamic Scattering: A New Electrooptic Effect in Certain Classes of Nematic Liquid Crystals", Proceedings of the IEEE, vol. 56, No. 7, Jul. 7, 1968, pp. 1-13.

International Search Report mailed May 14, 2014 in corresponding application No. PCT/US2014/015967.

Written Opinion mailed May 14, 2014 in corresponding application No. PCT/US2014/015967.

* cited by examiner

LIQUID CRYSTAL LIGHT VARIABLE DEVICE

CROSS-REFERENCE TO RELATED APPLICATION

This application claims priority to U.S. Provisional Patent Application No. 61/763,878, filed on Feb. 12, 2013, and entitled "A Liquid Crystal Light Variable Device", the entire disclosure of which is incorporated herein by reference.

BACKGROUND

Controlling the behavior of light transmission and reflection is the basis of many technologies, including such disparate technologies as flat panel displays, smart architectural windows and walls, eyewear, as well as a myriad of military devices.

Liquid crystals (LC) have been used for electro-optic applications and have found commercial success in a number of markets, most notably information displays and privacy window applications. Their operation has fallen into several distinct functional areas, each having its own performance criteria.

Twisted nematic, super twisted nematic, and similar liquid crystal based devices employ polarizers to control light transmission or reflection. In these systems, the change in the transmission of light is accompanied by very little change in the haze or scattering. In other words, the systems are preferentially designed to have low scattering or haze in all states of operation. In fact, the addition of scattering or haze can have a detrimental effect on the system's performance, since it can alter the polarization state parasitically.

Guest-host systems, such as, e.g., U.S. Pat. No. 6,239,778, employ a non-scattering liquid crystal host together with a dichroic dye "guest." Application of a voltage alters the orientation of the host liquid crystal and guest dye molecules, thereby altering the effective dye absorption cross-section and thus, the transmission of an incident light. Much like polarizer based systems these devices operate with very little change in scattering or haze. As in the polarizer-based systems, scattering is considered a parasitic effect that is avoided.

On the other hand, a different class of devices uses scattering effects that are useful for their operation. These devices use polymer dispersed liquid crystals (PDLC), Polymer Stabilized Cholesteric Texture (PSCT), NCAP, and Dynamic Scattering systems. In these systems, light transmission is controlled by inducing a significant amount of scatter in the material. Although dyes can be added to the system, their function is merely to introduce color or to enhance the scattering effect. These systems all exhibit a significant alteration in the scattering or haze between the two operational modes. Scattering can be caused by liquid crystal droplets such as in PDLC, focal conic texture such as PSCT, or dynamic turbulence induced by electro-hydro-dynamics, etc. However, in these systems, there is some residual haze even in their low-haze states, which is unacceptable for many optical applications.

Many applications cannot be served by either of the above methods alone. In other words, the application would require both a scatter free change in the transmission and/or a scatter based change in transmission. Furthermore, some applications have a specific fail-safe requirement, which is often not easy to implement on most light control technologies.

For example, there is recent interest in see-through near-eye display devices that when worn, enable the user to see his/her surroundings as well as an image displayed on the device near the wearer's eye (e.g. helmet mounted displays or eyewear devices such as Google Glass). In such applications, the quality of the displayed image depends on the amount of ambient light and allowing the user to reduce the amount of ambient light reaching the eye is advantageous when ambient light is bright. Adjusting ambient bright allows the brightness of the displayed image to remain the same. In some instances, it is advantageous to completely block any ambient light from reaching the eye, so that the user is "immersed" in the displayed image.

To address this, it is possible, for example, to stack two different liquid crystal devices on top of each other. In this case, the first device would be driven by one drive circuit and would alter its transmission without change in the scattering or haze, and the second device, which would be driven by a second drive circuit, would alter its scattering state with an applied voltage.

Those skilled in the art realize that this would significantly increase the cost and complication of production and the weight of the device. Furthermore, the device would not function as well, since combining the two systems in a tandem method means that the system carries the shortcomings of both technologies at all times.

There is a great need and desire to be able to accomplish these tasks within a single device. In other words, to combine the functionality of transparent low-tint to high-tint liquid crystal devices with the transparent to opaque capability of the second group of liquid crystal devices to achieve a single device that can switch between all of the above-mentioned states.

SUMMARY

The present application discloses material and systems that can perform two methods of light management: absorption and scattering, independently. This is achieved by a novel approach to electro-optic light control (an Electro-Chromo-Dynamic or ECD system), which exploits two light management properties within the same material. In particular, ECD devices that allow transitioning between three light control conditions—clear (low-haze), tinted (low-haze), opaque (high-haze)—by providing a method to selectively alter the absorption or scattering of an incident light.

Accordingly, described herein are various technologies that pertain to an electrically actuated liquid crystal variable light device that can transition between three different optical states under different electrical field conditions. The device can operate in either a low-haze low-tint state (also referred to herein as a "clear state"), a low-haze high-tint state (also referred to herein as a "tinted state"), or a high-haze high-tint state (also referred to herein as an "opaque state"), and is driven from one state to another by the application of a voltage waveform. The transition from one state to another may be abrupt (by switching from one state to another with no intervening states) or graduated (by gradually increasing or decreasing tint and/or opacity, resulting in one or more intermediate states).

A liquid crystal light variable device according to the present application includes a liquid crystal cell that contains a mixture of a liquid crystal material and one or more dichroic dyes interposed between two substrates. The mixture may be polymer-free to avoid undesirable optical textures. Each substrate has a conductive layer disposed upon it. Additionally, each substrate may have an alignment layer to help with the alignment of the liquid crystal molecules. The device further includes a voltage supply or controller coupled with the conductive layers for application of a voltage waveform across the liquid crystal cell. Based on the voltage waveform applied, the liquid crystal light variable device can transition between the clear, tinted or opaque states. Furthermore, in some embodiments, the tint and opacity of the device is variable depending on the voltage waveform applied. In this case, the voltage waveform can be varied in a step-wise manner, using discrete steps, or can be varied gradually, using small increments, so as to impart a smooth transition from one intermediate state to another.

Accordingly, the device has a low-haze low-tint state upon application of a first voltage waveform; a low-haze high-tint state upon application of a second voltage waveform; and a high-haze high-tint state upon application of a third voltage waveform. The voltage waveform or field may be applied automatically, manually, or as a manual/automatic combination.

In some embodiments, the first voltage waveform includes a voltage value of zero. In other words, the device operates in a clear state when V=0.

In other embodiments, the second voltage waveform includes a voltage value of zero. In other words, the device is maximally tinted when V=0.

In some embodiments, the device includes at least one intermediate state between the low-haze low-tint state, the low-haze high-tint state, or the high-haze high tint state.

The transition between the low-tint and high-tint states, or between low-haze and high-haze states, may be achieved by a continuous alteration in the applied voltage waveform or by a step-wise alteration in the applied voltage waveform, or a combination of the above.

Depending on the application, the device's liquid crystal cell substrates can be made of glass, plastic, or any other optically clear material. In some embodiments, the device may have additional components such as polarizers, a polymer matrix, additional non-dichroic dyes, etc.

In some embodiments, the mixture of the liquid crystal material and one or more dichroic dyes has an order parameter S greater than 0.7.

In some embodiments, the liquid crystal material has a thickness to pitch ratio (d/p) of less than 1.5.

In some embodiments, the liquid crystal material has a birefringence greater than or equal to 0.04 nm.

In some examples, the device in the low-haze low-tint state has a light transmission that is greater than or equal to 40%.

In some examples, the device in the low-haze high-tint state has a light transmission of less than or equal to 30%.

In various examples, a haze value of the device in the low-haze low-tint or low-haze high-tint state can be less than or equal to 10% and the haze value of the device in the high-haze high-tint state can be greater than or equal to 15%.

In various examples the transition time from a high haze state to a low haze state is less than 5, 10, 15, 20, 30, 40, 50 or 60 seconds. This transition time is an advantage of dynamic scattering as compared to transition times for a device using a focal conic texture type of scattering.

In some applications, the device can have one or more regions, each having a liquid crystal cell according to the invention, configured so that each region can be operated independently and can transition from one state to another independently of the other regions. Thus, for example, a first portion of the device can be in the clear or tinted state to allow ambient light to reach a viewer, while independent of the first portion, a second portion of the device can be in an opaque state, to allow, for example, a displayed image to be seen by the viewer.

Accordingly, also contemplated herein is a device where a portion of the device is used as a display.

Applications for the device of the invention include using the device as part of, or together with, an eyewear device, an eye-protective device, a near-eye display device such a head or helmet mounted display, a window, or a mirror (e.g. a bathroom mirror or a rear-view mirror of a vehicle, motorcycle, airplane, etc.), or the like.

Also contemplated is a method of altering the light transmission of a device by operating a liquid crystal light variable optic device according to the invention. The method includes the steps of: applying a first voltage waveform to the optic device to achieve a clear state, applying a second voltage waveform to the optic device to achieve a tinted state, applying a third voltage waveform to the optic device to achieve an opaque state.

In some embodiments, the method further includes varying the tint and opacity of the device by applying different voltage waveforms. In some embodiments, the voltage waveforms are pre-selected. The voltage or field may be applied automatically, manually, or as a manual/automatic combination.

Accordingly, in some examples, the first voltage waveform (resulting in a clear state) is from zero voltage to a first voltage threshold. In other embodiments, the second voltage waveform (resulting in a tinted state) is from zero voltage to a second voltage threshold. In various examples, the transition time from an opaque state to a clear state is less than 5, 10, 15, 20, 30, 40, 50 or 60 seconds.

The device's power supply or controller is configured to provide predetermined voltage waveforms of variable predetermined voltage and frequency to the conductive layers of the liquid cell substrates such that the liquid crystal-dichroic dye mixture align as follows: substantially perpendicular to the substrates to achieve a low-haze, low-tint state upon application of a first set of voltage waveforms; substantially parallel to the substrates to achieve a low-haze, high-tint state upon application of a second set of voltage waveforms; and substantially random due to dynamic scattering to achieve a high-haze high-tint state upon application of a third set of voltage waveforms.

In some examples, the light transmissive device is configured to display an image on at least a portion of the device.

In some examples, the light transmissive device has a split-screen configuration having two or more regions, each region having a separate power supply and capable of operating in one of the aforementioned low-haze low-tint, low-haze-high-tint, or high-haze high-tint states independent of any other region.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
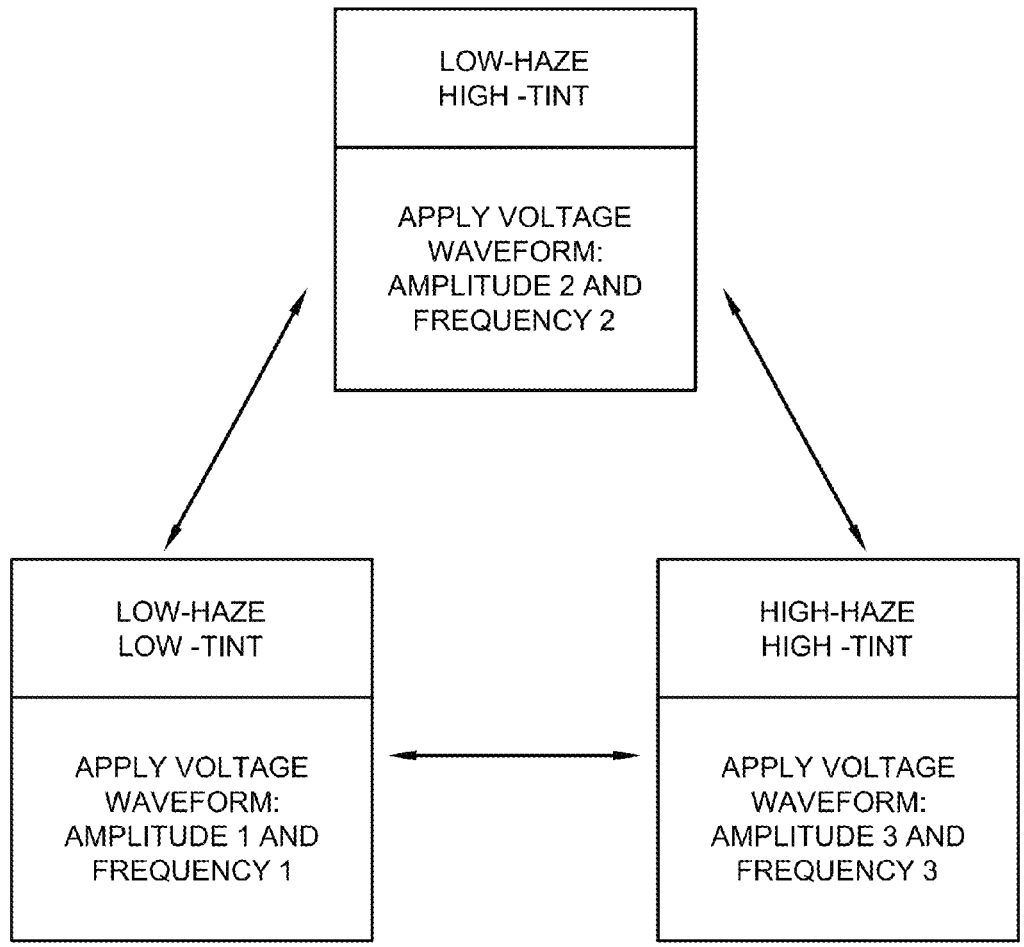
FIG. 1 is a schematic diagram of the different states of an electrically actuated liquid crystal light variable device according to the present invention.

Various technologies pertaining to an electrically actuated liquid crystal variable light device are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Herein incorporated by reference is Liquid Crystal: Applications and Uses, by Birenda Bahadur, published by World Scientific, 1992. All terms referenced in the present application should be interpreted in view of Liquid Crystal: Application and Uses, unless otherwise defined herein.

Provided herein is a device and methods for an electrically actuated light varying device that exhibits three distinct optical states under different electrical field conditions. The device can operate in either a low-haze low-tint state ("clear state"), a low-haze high-tint state ("tinted state"), or a high haze high-tint state ("opaque state"), and is driven from one state to another by application of an voltage waveform. Additionally, in some embodiments, the amount of haze and tint in each state can be varied by varying the applied field.

Accordingly, the low-haze low-tint state occurs upon application of a first voltage waveform; the low-haze high-tint state occurs upon application of a second voltage waveform; and the high-haze high-tint state occurs upon application of a third voltage waveform. (See FIG. 1)

The properties described above are achieved by providing a light varying liquid crystal cell comprising a liquid crystal material and one or more dichroic dyes capable of aligning with the liquid crystal molecules in order to alter the light absorption/transmission of the device. In addition, the mixture includes various ions, chosen to allow the mixture to undergo dynamic flow upon application of a preselected voltage waveform having a specific voltage and/or frequency.

Definitions

"Haze" or "hazyness" is simply scattering of light by a medium, which results in a cloudy appearance. The type of haze depends on the way that the observer views an object. The terms "haze" and "haze value," as used herein, refer to the transmission haze of the optical device.

"Transmission Haze" is defined as the forward scattering of light from the surface of an optical device viewed in transmission. "Transmission haze" refers to haze when a transparent or slightly translucent material is viewed by looking at the light that is transmitted through it. Normally, light scattered back though the sample is not included. Haze is the percentage of light scattered more than a certain angle from incident light direction. When measuring haze, the percentage of light diffusely scattered ($T_{diffuse}$) compared to the total light transmitted ($T_{total}$) is i reported as:

$$\% \text{ Haze} = T_{diffuse} \times 100 / T_{total} \text{ where } T = \% \text{ transmission.}$$

For example, the haze value may be the value as measured by BYK-Gardner Haze Meter (BYK Gardner USA, Columbia, Md.).

"Low-haze" refers to a state where the haze value is minimal, typically less than or equal to 10%. In some embodiments, the haze value may be less than or equal to: 9%, 8%, 7%, 6%, 5%, 4%, 3%, 2%, or 1%.

"High-haze" refers to a state with a maximum haze value that is greater than or equal to: 15%. In some examples, the haze value is greater than or equal to: 20%, 30%, 40%, 50%, 60%, 70%, 80%, or 90%. In some examples, it can be up to 100%.

"Low-tint" refers to a state where the device has the most light transmission, typically light transmissivity greater than or equal to 40%. In some embodiments, the light transmissivity in the low-tint state is greater than or equal to: 45%, 50%, 55%, 60%, 65%, 70%, 75%, 80%, 85%, 90%, or 95%.

"High-tint" refers to a state where the device has the least light transmission, typically a light transmissivity less than or equal to 30%. In some embodiments, the light transmissivity in the high-tint state is less than or equal to: 25%, 20%, 15%, 10%, or 5%.

"Liquid crystal material" and "liquid crystal host material" are used interchangeably and refer to a liquid crystal with negative dielectric anisotropy or a liquid crystal with a positive dielectric anisotropy.

"Dichroic dye" and "dichroic dye guest material" are used interchangeably and refer to dyes with positive dichroic anisotropy.

Applied "voltage", or "voltage signal" are used interchangeably and refer to an electric signal with a predetermined voltage amplitude and frequency and are related to "electric field" by cell gap "Voltage waveform", as used herein, refers to a pre-selected sequence of applied voltage signals. The terms "voltage" and "voltage amplitude" are used interchangeably and refer to the amplitude of the voltage waveform.

Description

Figure 2:
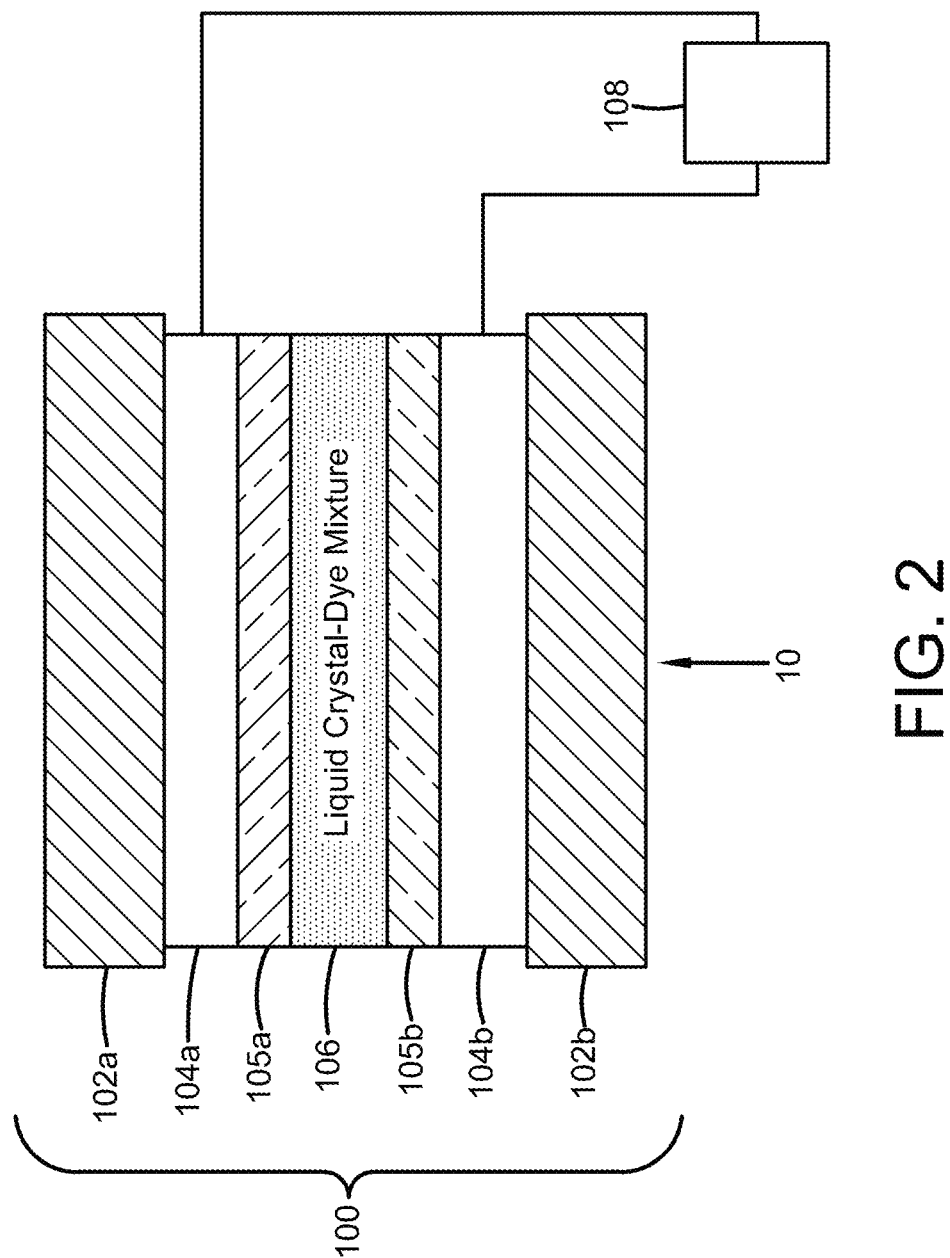
FIG. 2 is a schematic cross-sectional diagram of a liquid crystal cell employed in the liquid crystal light variable device.

Referring now to the drawings, FIG. 1 illustrates the different states of the electrically actuated liquid crystal light variable device. FIG. 2 is a cross-sectional representation of the liquid crystal light variable device 10 that includes a light varying liquid crystal cell 100 connected to a voltage source or controller 108.

The cell 100 includes a mixture of liquid crystal material and dichroic dye 106 interposed between a pair of opposed substrates 102a, 102b. In most embodiments, the mixture is polymer-free. Conductive or electrode layers 104a, 104b are disposed on an inner surface of each substrate 102a, 102b, respectively. Electrode layers 104a and 104b are electrically conductive and may be formed from materials such as indium tin oxide, conducting polymer, or the like. Alignment layers 105a, 105b may be provided on an inner surface of conductive layers 104a, 104b, respectively. Alignments layers 105a and 105b are provided to control the orientation of liquid crystal materials disposed between the substrates. The controller 108 is connected to each conductive layer 104a, 104b and is configured to apply an voltage waveform across the cell.

The liquid crystal material may be a nematic or a chiral nematic (cholesteric) liquid crystal. The latter is a nematic with chiral additive as a dopant to produce a desired pitch length. Suitable nematic liquid crystals and chiral materials are commercially available and would be known to those of ordinary skill in the art in view of this disclosure.

The choice of liquid crystal material and device configuration such as cell gap and alignment layer in the light varying liquid crystal device is based on the principle that the device should be capable of transitioning between an optically acceptable low-haze state (clear or tinted) and a high-haze state without the formation of unwanted textures such as focal conic, finger print or the like.

Liquid crystals are inherently birefringent, which can result in polarization sensitivity of the device. The liquid crystal material may include more chiral material if lower polarization sensitivity is desired, or less chiral material if greater polarization sensitivity is desired. The amount of chiral material in the liquid crystal material is inversely related to the induced intrinsic pitch of the liquid crystal material. Using a greater amount of chiral material results in a shorter pitch, and if the pitch is too short, it becomes difficult to control the liquid crystal texture, which may result in formation of focal conic or figure print textures. Since these textures increase haze in all states, they can reduce performance for optical applications and should be avoided. Thus, the thickness-to-pitch ratio or d/p of the liquid crystal mixture in the cell is chosen such that formation of undesirable textures is minimized. Typically, a d/p value of less than 1.5 (i.e., $0 \leq d/p \leq 1.5$) will avoid focal conic texture. In some examples, the d/p is less than 1.4, 1.3, 1.2 or 1.1. Some examples may use liquid crystals with a d/p=0.

In some embodiments, the liquid crystal material has a birefringence greater than or equal to 0.04. In other embodiments, the birefringence can be greater than or equal to 0.07, 0.09, 0.12, 0.17, 0.24, 0.27, 0.30.

The dichroic dye is a dye stuff that selectively absorbs light of select wavelengths within the visible region of the spectrum. Further, the absorption coefficient of the dye is orientation dependent and hence light with different polarizations are absorbed at different amounts. Furthermore, the absorption coefficient cross-section of the dye is higher along the axis that orients with the liquid crystal director. The term "dichroic dye" is used herein to include a single dye or a plurality of dyes each with distinct dichroic properties.

The liquid crystal-dichroic dye mixture is used to vary the amount of light transmitted through the device. The maximum contrast between the clear and tinted states of a liquid crystal cell depends on the alignment of the dichroic dyes. Dichroic dyes have the ability to align themselves with nematic liquid crystal molecules when mixed together. When an voltage is applied to such a guest-host mixture, the nematic liquid crystal host molecules reorient and align either with or perpendicular to the electric field in order to minimize the torque they experience from the electric field. The dichroic dye (guest) molecules may not be directly affected by the external electric field but can align themselves with the liquid crystal host molecules. It is their interaction with the liquid crystal molecules that forces them to reorient.

The statistically averaged orientation of the elongated molecules, liquid crystal and dichroic dye, in a guest-host mixture points in a particular direction and a unit vector along this direction is called the "director." Since all molecules in the mixture are subject to random thermal motion as they diffuse, each molecule will not point in exactly the same direction as the director, even when an electric field is applied. A statistical average of the molecular orientation or tilt with respect to the director is known as the "order parameter, S", which ranges in value from 0 to 1. An order parameter of S=1 corresponds to all molecules being perfectly aligned with the director. (See *Liquid Crystals Applications and Uses*, vol. 3, edited by B. Bahadur, published by World Scientific Publishing Co. Pte. Ltd., 1992). Thus, the higher the order parameter S, the more the dichroic dye molecules are aligned, thereby optimizing absorption for any particular molecular orientation. In some embodiments, the liquid crystal-dye mixture of the present invention has an order parameter S greater than or equal to 0.7. In other embodiments, the order parameter S may be greater than or equal to 0.75, 0.8, or 0.85.

For optical grade devices, the liquid crystal-dye mixture is polymer-free so as to avoid the formation of focal conic, finger print and other unwanted textures. However, in some embodiments, where optical clarity is not so critical (i.e. window or some mirror applications, etc.) the mixture may further include a polymer to form a polymer matrix. These may be used for encapsulated fluid applications or to augment the alignment of the liquid crystal material in the absence of the applied voltage.

The liquid crystal-dichroic dye mixture further contains ionic impurities or dopants. As known in the art, depending on the applied waveform, these ionic impurities will migrate within the liquid crystal material. Charged particles in a condense system will drift in electrical fields, along the field lines. In our case they will drift towards oppositely charged electrode plate. The drift velocity is proportional to the filed magnitude (which is proportional to applied voltage difference). For example, if an AC filed is present, at the end of each half period the charged particles change the direction of their drift velocity. Since the charge is attached to the ionic dopants, the charge drift is accompanied by mass flow. As soon as the drift distance becomes comparable to the cell thickness the coupling/interaction between the flow field and the director field becomes non-negligible. In the case of a negative anisotropy material, the external field aligns the molecules parallel to the substrates (perpendicular to the field) in the center of the cell. The mass flow is along the field lines, across the cell. Since flow will align the molecules, this aligning is opposite to the previously mentioned. The two opposing alignment forces will result in instability in the director field, referred to as "electro-hydrodynamic instability".

At the early onset of this phenomenon, the coupling may result in periodic flow and director patterns ("Williams domains", rolls). With increasing field, however, the flow becomes more turbulent and chaotic and so does the director field. However, it should be noted that since liquid crystals are birefringent, any local disturbance induces a scattering of an incident light, even in the absence of a turbulent flow. This phenomenon is generally known as "dynamic scattering". The amount of ionic impurities must be large enough to induce significant dynamic scattering but not too much so as to destroy the liquid crystal orientation in the absence of the field. As known in the art, this concentration depends on the cell configurations, alignment layers in the cell, liquid crystal material and voltage waveforms. The acceptable amount is determined by noting presence of significant dynamic scattering (haze greater than 15%) in the presence of a waveform without any effect on the alignment of liquid crystal in the absence of an applied voltage. It should be noted that at sufficiently high frequency voltage waveforms, the migration is minimized and the overall dynamic scattering performance is reduced. A number of materials, known in the art, such as organic salts can be used as dopants for dynamic scattering such as, for example, CTAB, Conducting Salt 235, dodecyl-ethyldimethylammonium-4-hexyloxybenzoate, etc. However, these dopants must remain soluble in the liquid crystal material.

The substrates 102a, 102b may be substantially transparent to allow visible light to pass through substantially unaltered. The substrates may be made of plastic (e.g. flexible polymer) or glass, and the shape of the substrates may be flat, curved or doubly curved (i.e., curved in more than one plane).

The substrates will have a transparent conductive layer 104a, 104b such as ITO, IZO, conductive polymers or the like. In addition, the substrates may have a transparent insulating coating covering part or covering all of the transparent conductive layer 104a, 104b. In addition, the transparent conductive layer will be coated by an alignment layer 105a, 105b, which will be used to dictate the orientation of the liquid crystal material in the absence of an external field. For this application, if the liquid crystal material has an overall dielectric anisotropy that is negative the material tends to align perpendicular to the applied electric field. In this case, a homeotropic alignment layer that is used for this application. These include polyimides such as Nissan 5661 or alike. If, the overall dielectric anisotropy of the liquid crystal is positive, then a planar alignment layer such as rubbed PVA can be used. The substrates are typically separated by a distance of 3-100 µm, a preferred separation being 10-30 µm, using spacers known in the art.

The controller 108 is configured to apply a voltage waveform across the cell with a variable voltage and/or frequency. The voltage can be either AC or DC or a combination thereof. Further, the controller 108 may be configured to apply various preselected combinations of voltage amplitude and frequency to effectuate varying textures of the mixture of liquid crystal material and dichroic dye 106, thus achieving a multitude of light transmissive states. Thus, each state is selectable via an applied voltage amplitude and/or frequency and by applying a desired voltage waveform, the device can be switched between the states selected from the plurality of states.

The electrically actuated liquid crystal variable light device may be included with or integrated into a mirror, window, eyewear device, eye-protective device, a near-eye display device such as a head or helmet mounted display device, a heads-up-display device, or a variety of devices where a viewer is required to be able to see his or her surroundings, as well as, being able to see an image displayed on the device.

The present application may be implemented as a single device in a large cell or as an array of small cells within any of the above devices.

For some uses of the device, the transmissivity of only a portion of a device may be selectively lowered or raised to limit the amount of light passing through that portion. Further, the haziness of only a portion of the device may be selectively lowered or raised to limit the clarity of light passing through that portion. Therefore, also contemplated are split-screen devices where the device may have one or two portions that can operate separately and independently of each other.

For other applications, the transmissivity or haziness of small portions of a display may be selectively lowered or raised. Controlling the transmissivity and haziness of small portions of the display allows for a finer control of the light that is passing through the device. In some uses of the electrically actuated optical device, small portions of a display, in conjunction with one another, may display patterns or images. Selectively modulating transmissivity and haziness of desired cells can produce such images. Such adjustments may include increasing transmissivity and decreasing haziness of the select cells to display a pattern or image with a dark background. Such patterns and images can be displayed to provide information for a user.

It should be noted that the opacity of the device arises not only from multiple light scattering events caused by the turbulent liquid crystal, but is further augmented by the dichroic dyes in the mixture, which further attenuate both reflected and transmitted light.

Embodiments

As seen in FIG. 1, which illustrates a state diagram of the electrically actuated liquid crystal light variable device, the low-haze low-tint state occurs upon application of a first voltage waveform; the low-haze high-tint state occurs upon application of a second voltage waveform; and the high-haze high-tint state occurs upon application of a third voltage waveform. The three voltage waveforms (and the in-between states) can have various configurations.

Different embodiments can be realized depending on the device application. In a first embodiment, the device is low tint-low haze when there is no voltage applied (i.e., the first waveform includes V=0). In this case, a negative liquid crystal host with a guest dye with positive dichroism filled between substrates coated with a homeotropic alignment layer is used. In a second embodiment, the device is high tint-low haze when there is no voltage applied (i.e., the second waveform includes V=0). In this case, a positive liquid crystal host, along with a positive dichroic dye, is used in a planar cell.

Figure 3:
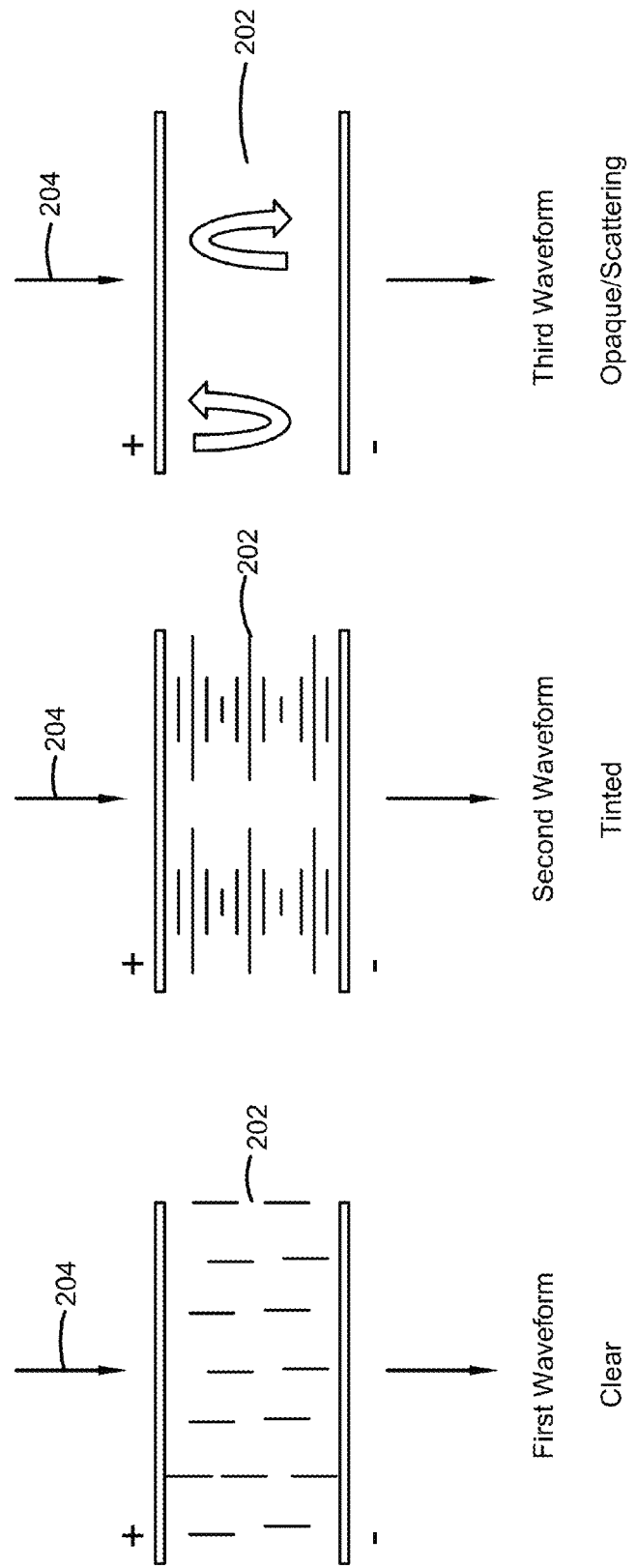
FIG. 3 is a schematic diagram of the liquid crystal host molecule orientation during various states.

FIG. 3 is a schematic diagram of the liquid crystal host molecule orientation during various states, illustrating the alignment of the mixture of liquid crystal material and dichroic dye 202 of the device—with various voltage waveforms present—in relation to the optic axis 204.

While a first waveform is applied, the liquid crystal molecules are homeotropically aligned along the optic axis 204 (i.e. perpendicular to the substrates). Thus, the device operates in the low-haze low-tint state ("clear state"). With the application of a second waveform, the liquid crystal cells are in a predominantly twisted planar orientation parallel to the substrates. As a result, the device is in a low-haze high-tint state ("tinted state"). When a third waveform is applied to the cell, a dynamic scattering state is induced in the liquid crystal-dye mixture 202, thus prompting the device to operate in the high-haze high-tint state ("opaque state"). The transition time from an opaque state to a clear state is less than 5, 10, 15, 20, 30, 40, 50 or 60 seconds.

Figure 4:
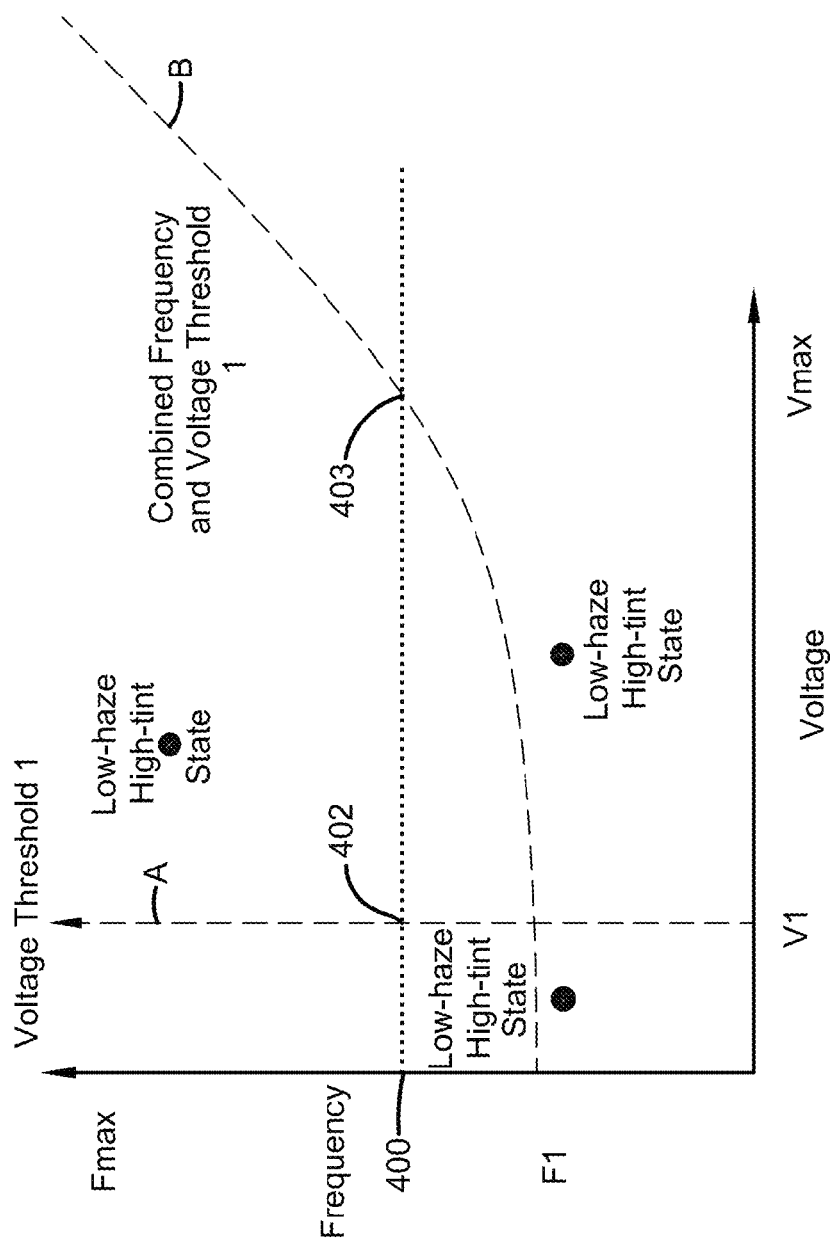
FIG. 4 is a schematic graph showing an example of voltage and frequency combinations that can be used to achieve each clear, tinted or opaque state.

FIG. 4 is a schematic graph showing an example of voltage and frequency combinations that can be used to achieve each state, illustrating schematic curves of the waveforms that can be applied in an example of the first embodiment, (i.e. showing various combinations of voltage and frequency as they relate to the plurality of states). In this embodiment, the device operates in a low-haze low-tint state when a first voltage waveform is from zero (field-OFF) to a first voltage threshold (A). The device is in a low-haze high-tint state when a waveform with a voltage equal to or above the first voltage threshold (A) and equal to or above a first combined frequency and amplitude threshold curve (line B) is applied. Further, the device is transitioned to a high-haze high-tint state when a voltage waveform with a voltage equal to or above the first voltage threshold (A), but a voltage/frequency below the first combined frequency and amplitude threshold curve (line B) is applied.

Accordingly, if a frequency is kept constant at a value represented by 400: when the field is between V=0 and V1 (point 402 on the graph), the device is in a clear state; when the voltage is between point 402 and 403 the device is in a tinted state; and when the voltage is between point 403 and Vmax the device is in an opaque state. Thus, the device is capable of transitioning from any state to any other state. Furthermore, if so desired, the device is further capable of varying the amount of tint and/or opacity depending on the applied voltage amplitude/frequency.

Accordingly, by varying the voltage between V1 and Vmax, the device's tint can be varied (reduced/increased) by varying the voltage and/or the frequency applied, as long as the waveform values fall above line B. Similarly, the opacity of the device can be adjusted (increased or decreased) by varying the applied voltage and/or frequency as long as the waveform values fall below line B. The waveform values can be altered by varying the voltage amplitude alone while keeping the frequency constant, by varying the frequency while keeping the voltage amplitude constant, or by varying both voltage amplitude and frequency.

Thus, in the first embodiment of the device, a voltage waveform with low amplitude may effectuate the low-haze low-tint state ("clear state"). A voltage waveform with high amplitude and a low frequency may produce the high-haze high-tint state ("opaque state"); and a voltage waveform between the low and high amplitudes and with a high frequency may effectuate the low-haze high-tint state ("tinted state").

The drive parameters, which enable transition from one state to another, may be determined by the liquid crystal-dye mixture and a combination of voltage amplitude, frequency, and ion impurity in the system. Any voltage/frequency combination can be chosen to make the device switch from one state to another and the actual voltage/frequency values, which are dependent on the materials used, thickness of the cell, etc. can be chosen according to techniques known in the art.

In the second embodiment, the alignment of the liquid crystals is reversed, i.e., the liquid crystal molecules are in a twisted planar orientation parallel to the substrates in a voltage OFF condition, rendering the device in a tinted state. Upon application of a field (i.e., the first waveform), the liquid crystal cells become homeotropically aligned along the optic axis 204 (i.e., perpendicular to the substrates), rendering the device in a clear state (i.e., a low-haze low-tint state). When the third waveform is applied to the cell, a dynamic scattering state is induced in the liquid crystal-dye mixture 202, thus prompting the device to operate in an opaque state (i.e., a high-haze high-tint state). The transition time from an opaque state to a clear state is less than 5, 10, 15, 20, 30, 40, 50 or 60 seconds. This quick transition time is an advantage of dynamic scattering.

The liquid crystal cell in this second embodiment uses a positive anisotropy host with positive dichroic dye.

Figure 5:
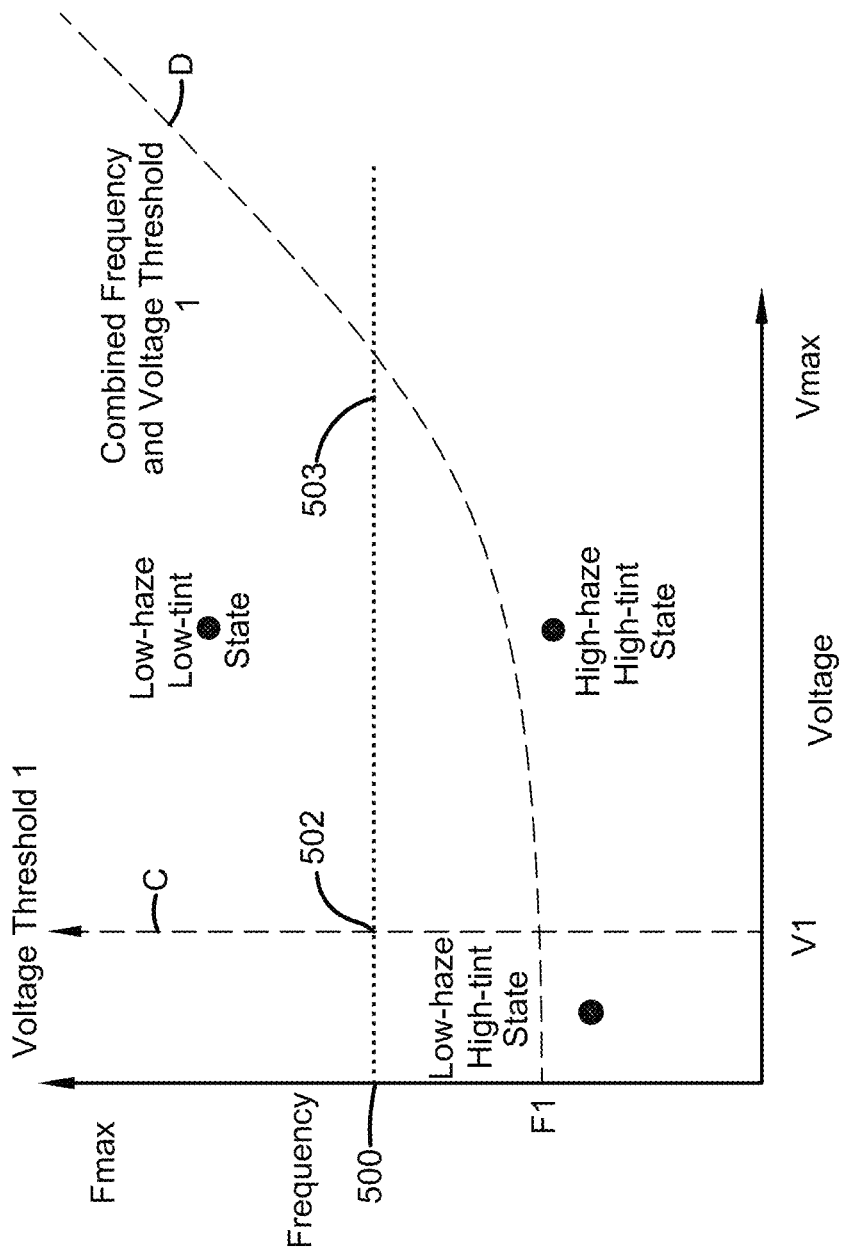
FIG. 5 is a schematic graph showing another example of voltage and frequency combinations that can be used to achieve each clear, tinted or opaque state.

FIG. 5 is a schematic graph showing another example of voltage and frequency combinations that can be used to achieve each state, and illustrates schematic curves of another example of waveforms that can be applied in the second embodiment, showing various combinations of voltage and frequency as they relate to the plurality of states. In this embodiment, the device operates in a low-haze high-tint state when a voltage waveform is from zero (field-OFF) to a voltage threshold C. The device is in a low-haze low-tint state when a waveform with a voltage equal to or above the voltage threshold (C) and equal to or above a combined frequency and voltage threshold (line D) is applied. Further, the device is in a high-haze high-tint state when a voltage waveform with a voltage equal to or above the voltage threshold (C) but a voltage/frequency below the first combined frequency and voltage threshold (line D) is applied.

Accordingly, if a frequency is kept constant at a value represented by 500, when the voltage is between V=0 and V1 (point 502 on the graph), the device is in a tinted state, when the voltage is between point 502 and 503, the device is in a clear state, and when the voltage is between point 503 and Vmax, the device is in an opaque state. The device is capable of transitioning from any state to any other state. If desired, the device is further capable of varying the amount of tint and opacity depending on the applied voltage amplitude/frequency.

Accordingly, by varying the voltage between V1 and Vmax, the device's transparent tint can be varied (i.e., reduced or increased) by varying the voltage and/or the frequency applied, as long as the waveform values fall above line D. Similarly, by the opacity of the device can be adjusted (i.e., increased or decreased) by varying the applied voltage and/or frequency as long as the waveform values fall below line D. The waveform values can be altered by varying the voltage alone while keeping the frequency constant, by varying the frequency while keeping the voltage constant, or by varying both voltage and frequency.

Thus, in the second embodiment of the device, a voltage waveform with low amplitude may effectuate the low-haze high-tint state ("tinted state"). A voltage waveform with high amplitude and a low frequency may produce the high-haze high-tint state ("opaque state"); and a voltage waveform between the low and high amplitudes and with a high frequency may effectuate the low-haze low-tint state ("clear state").

It should be noted that FIGS. 4 and 5 show only an example of many different waveform curves that can be used with the device. Thus, the shape of the curves and the representative dots indicating the states in FIGS. 4 and 5 are for illustrative purposes only and should not be taken as the only curves or possible waveform combinations that can make the liquid crystal light variable device function as claimed.

Also contemplated here is a method of altering the light transmission of a device by operating a liquid crystal light variable device according to the present invention. The method includes the steps of: applying a first voltage waveform to the optic device to achieve a clear state, applying a second voltage waveform to the optic device to achieve a tinted state, and applying a third voltage waveform to the device to achieve an opaque state.

The method may further include varying the tint and opacity of the device to achieve intermediate states by applying different voltage waveforms. In some embodiments, the voltage waveforms are pre-selected, resulting in a step-wise transition. Thus, the transition between low-tint and high-tint, or between low-haze and high-haze, can be achieved by continuous or step-wise alteration in the voltage waveform. The voltage or field may be applied automatically, manually, or as a manual/automatic combination.

Accordingly, in some examples, the first voltage waveform (resulting in a clear state) is from zero voltage to a first voltage threshold. In other embodiments, the second voltage waveform (resulting in a tinted state) is from zero voltage to a second voltage threshold.

While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Further, as used herein, the term "exemplary" is intended to mean "serving as an illustration or example of something."

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

EXAMPLE 1

A liquid crystal cell was made with the following properties: at zero voltage the cell was maximally clear (i.e., lowest tint) and haze free (i.e., lowest haze); at intermediate voltage and/or high frequency, the device had variable tint with tunable opacity (within a range) via voltage adjustment; and at high voltage/low frequency, the device operated in dynamic scattering mode, in which it was maximally opaque (as viewed from all angles). A device using the cell described in this example would be "fail-clear," in that should electrical power be interrupted, it would revert to its clear state.

The cell was prepared using a solution of negative dielectric anisotropy nematic liquid crystal containing a small amount of chiral additive (d/p~0.5-0.8), a small amount of a positive anisotropy dichroic dye mixture optimized for the liquid crystal host, and a very low, optimized amount of ionic dopant. The mixture ingredients were as follows:

Liquid crystal: The dynamic scattering mixture/solution consisted of: 19.79 g of AMI92500-100, delta eps=−5.5, delta n=0.2; (Jiangsu Hecheng Chemical Materials Co., Yang Zhong City, CHINA).

Dichroic dye: mixture of SL01123/1032/1089/1303/1112/1215 and ZL01060 (AlphaMicron Inc., Kent, Ohio) total of 0.8 w %;

Ionic dopant: CTAB (cetyl trimethyl ammonium bromide) 0.0596 g (0.3 w %) from Sigma-Aldrich;

Chiral dopant: S-811 Merck chiral dopant 0.044 g (0.22 w %, d/p~0.57) from Merck, (Darmstadt, Germany);

A cell having two plastic films (substrates), sealed at the edges and separated by 20 micron gap using plastic beads, was filled with the dynamic scattering solution. The plastic substrates were coated with indium-tin oxide to provide transparent electrodes. The electrodes were coated with homeotropic polyimide to give alignment of the liquid crystal perpendicular to substrates.

At zero field, the cell was without any scattering and slightly tinted. When a AC voltage (Vrms~8-10 V) at larger frequency of >500 Hz, was applied across the cell, it became more tinted but still with minimal scattering (haze). When the Vrms was switched to >20V and the frequency was adjusted to ~20 Hz, the cell became highly turbid with scattering behavior, like a milky glass, but had a dark tint due to the presence of the absorbing dyes.

Figure 8:
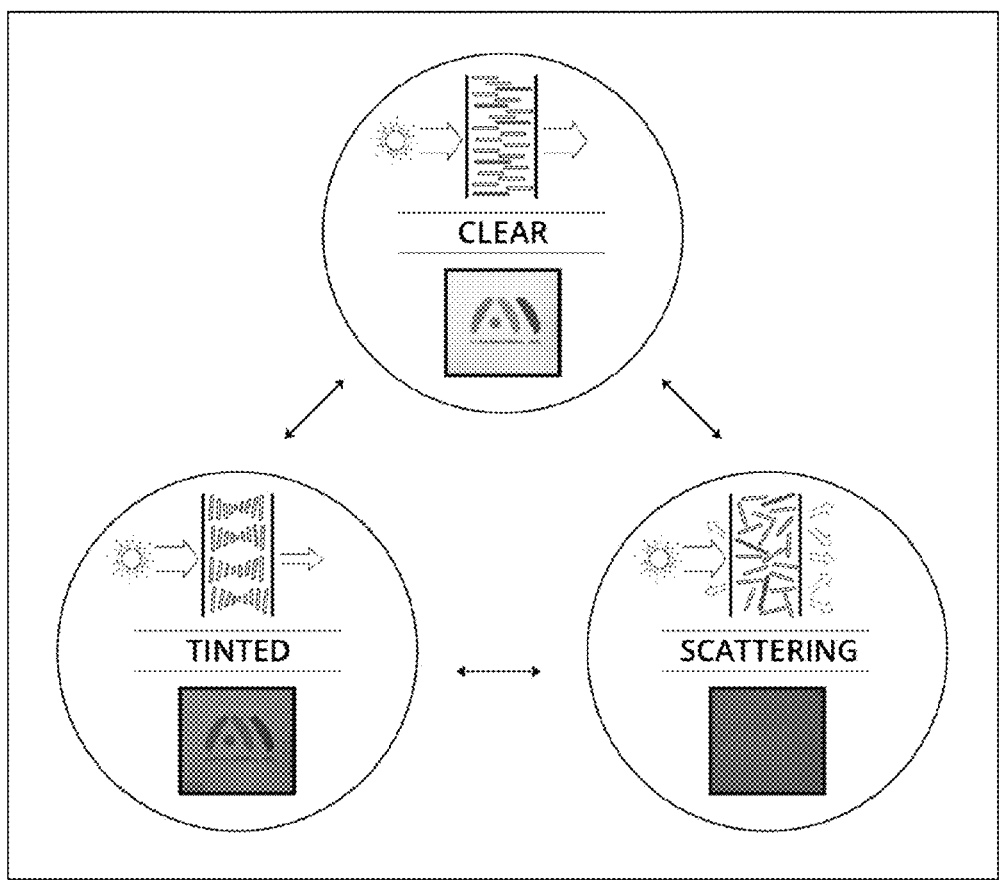
FIG. 8 is a schematic diagram of the various states of the device in Example 1.
Figure 9:
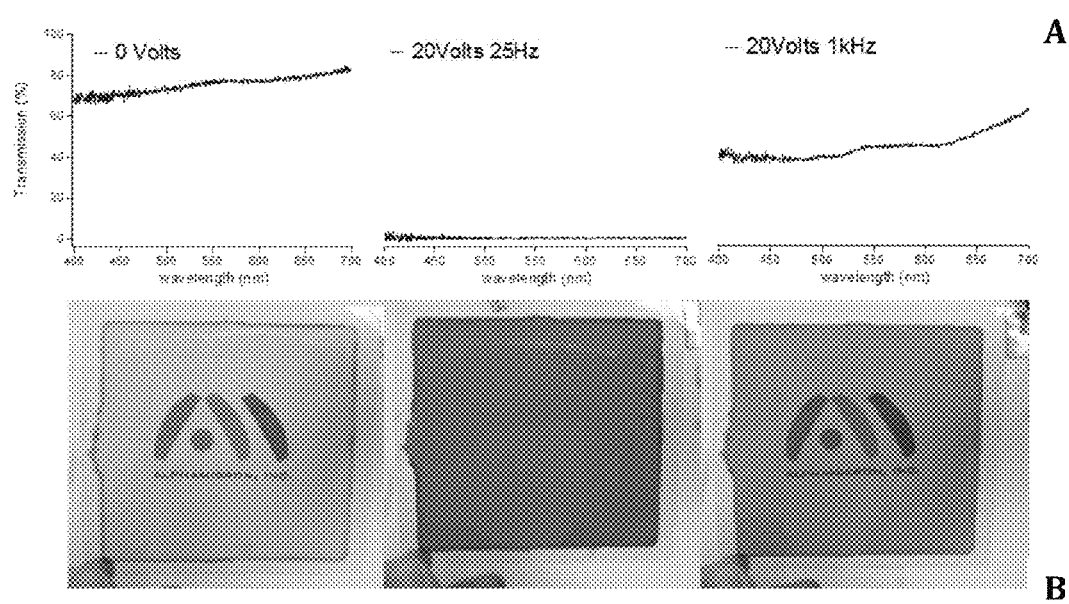
FIG. 9A represents graphs showing the % transmission of the liquid crystal cell of Example 1 with different applied voltage amplitude/frequency values.
FIG. 9B represents pictures showing the cell of Example 1 under different applied voltage waveforms.
Figure 10:
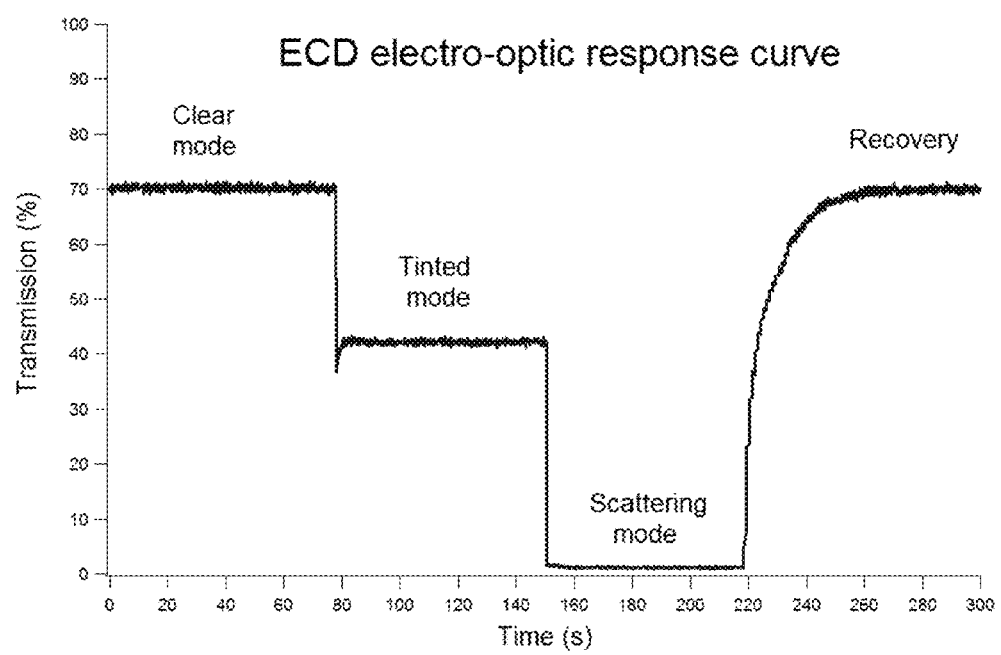
FIG. 10 is a graph showing the response curve of the cell of Example 1 as % transmission plotted against time.

The cell's appearance and the voltage/frequency parameters used in the example are shown in FIGS. 8-10.

Persons of skill in the art will know that other liquid crystal hosts are possible. Some example include the following proprietary liquid crystals from Merck (Darmstadt, Germany): MLC 2081 (de=−4.2, dn=0.2), MLC2163 or MLC 2159 (both with de=−4, dn=0.25).

Figure 6A:
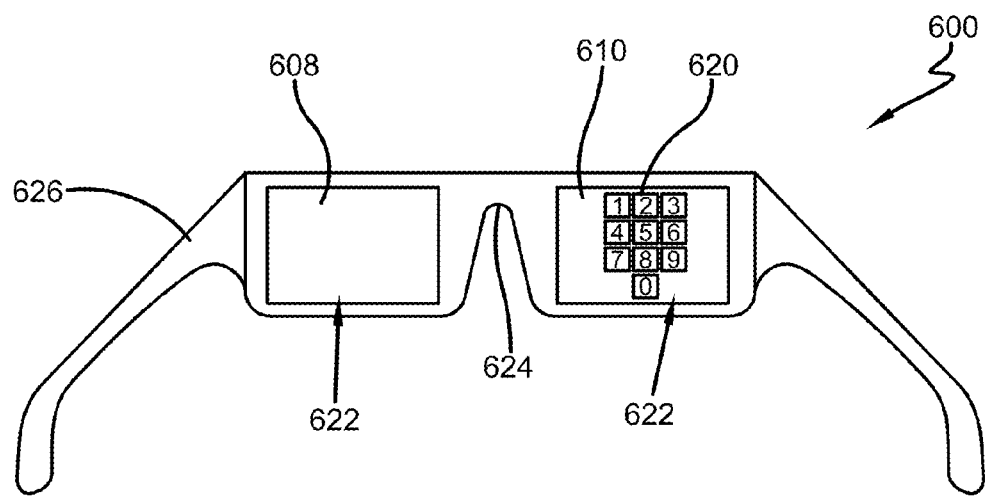
FIGS. 6A and B show schematic diagrams of examples of eyewear devices having display, non-display and transmissive portions.
Figure 6B:
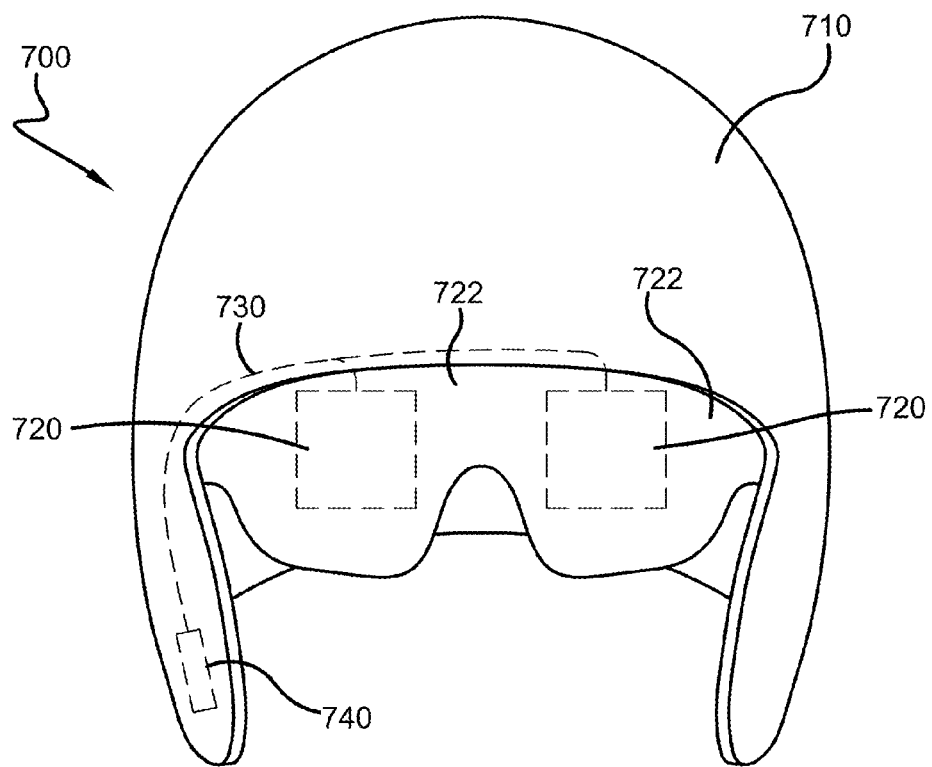
Figure 7:
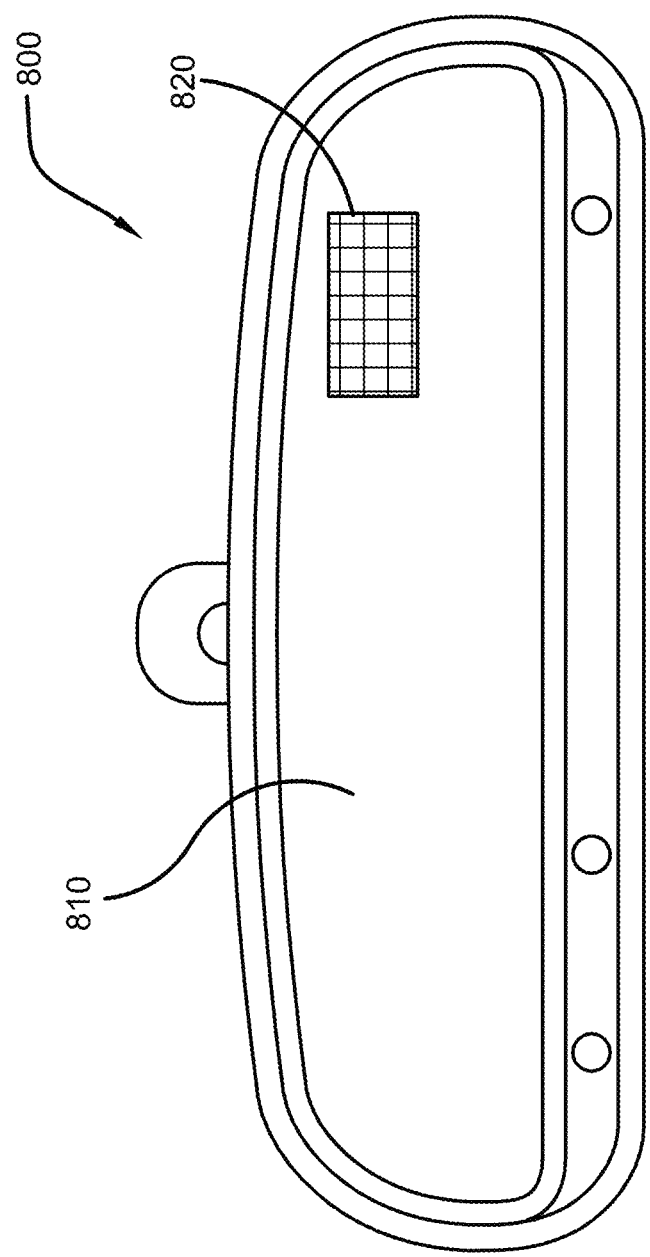
FIG. 7 is a schematic diagram of a rearview mirror of a vehicle having display and reflective portions.

FIGS. 6A and 6B show a schematic diagram of examples of eyewear devices using an electrically actuated liquid crystal variable light device or ECD, as described. Eyewear device 600 has a transmissive portion 608, a non-display portion 610 and a display portion 620. The device 600, which may be glasses, goggles, or the like, has a front lens 622, a nose piece 624, and temples 626. Ambient light reaches the eye through the front lens 622. The transmissive portion 608 may be a plain lens, or may be a light variable device operated to transition between a clear state and a tinted state depending on the amount of ambient light that is desired to reach the wearer's eyes. The non-display portion 610 may operate similarly to the transmissive portion 608 (having only a clear state, or capable of transitioning between clear and tinted states), or it may be an ECD device having the ability to transition between clear/tinted/and opaque states.

The display portion 620 may serve as a beam combiner that combines light from a projected display and ambient background. The display portion 620, or a layer placed behind it, can act as an ECD device that can transition between a clear state, a tinted state, and an opaque state, in order to alter the amount of light reaching the eye through the display portion 620. A wearer can use the device 600 as light variable sun glasses (having clear and tinted states), but can additionally use it to better view light from a display on the display portion 620 of the front lens 622. While viewing a display, the wearer has the ability to alter the amount of ambient light reaching the eye through transmissive portion 608 and non-display portion 610 as well as display portion 620, thus altering the perceived brightness of the displayed image. Since a bright exterior (ambient) light diminishes the perceived brightness of a displayed image, when under bright conditions, the user can select a tinted state, or an opaque state to reduce or eliminate the amount of light reaching the eye (either the eye seeing the display, and/or both eyes). It should be noted that in this example, the display portion is only represented on one front lens, but that on other examples, both front lenses may have a display portion. The temples can house the necessary wiring or electrical connections between the electronically controlled lenses and the controller 640.

FIG. 6B is a schematic diagram of a helmet mounted display 700, such as is used by pilots, gaming devices (using gaming helmets), etc. It includes a helmet 710 having a front lens 722 with a display portion 720, which may be present on one or both front lenses 722. The electrical connection (e.g. wire) 730 connects the front lens 722 and display portion 720 to a controller 740 inside the helmet. The principal of operation is as described for device 600.

FIG. 8 is a schematic diagram of a autodimming rearview mirror of a vehicle which contains a small display and reflective portions. Thus mirror 800 contains a non-display portion 810 and a display portion 820. In this case, as opposed to device 600, the display portion 820 can also serve to display images in conjunction with a backlight from the mirror. In addition, in this application, a reflector is placed behind the non-display portion 810. In this manner, the user can see a reflected image in the non-display portion 810, which can be operated in a clear or tinted state depending on ambient light conditions. Similarly, the display portion 820 can operate as an ECD device, capable of transition between clear and tinted states when there is no image to be displayed, Or, transition between clear, tinted and opaque states, as desired, to display an image. Other devices, such as windows that can be darkened or made opaque to display an image are also contemplated herein.

What is claimed is:

1. A liquid crystal light variable device, comprising: a liquid crystal cell comprising a mixture of a liquid crystal material, ionic impurities and one or more dichroic dyes interposed between a first and a second substrate,
    wherein each substrate has a conductive layer disposed thereon; a voltage supply coupled with the conductive layers for application of a voltage waveform across the liquid crystal cell;
    wherein, based on the voltage waveform applied, the liquid crystal light variable device transitions between states selected from: a low-haze low-tint state; a low-haze high-tint state; and a high-haze high-tint state, wherein the high-haze is caused by dynamic scattering of the liquid crystal mixture.

2. The liquid crystal light variable device of claim 1, wherein: the low-haze low-tint state occurs upon application of a first voltage waveform; the low-haze high-tint state occurs upon application of a second voltage waveform; and the high-haze high-tint state occurs upon application of a third voltage waveform.

3. The liquid crystal light variable device of claim 1, wherein the first voltage waveform includes a voltage value of zero.

4. The liquid crystal light variable device of claim 1, wherein the second voltage waveform includes a voltage value of zero.

5. The liquid crystal light variable device of claim 1, wherein the device includes at least one intermediate state between the low-haze low-tint state, the low-haze high-tint state, or the high-haze high tint state.

6. The liquid crystal light variable device of claim 1, wherein the transition between the low-tint and high-tint states, or between low-haze and high-haze states, is achieved by continuous or step-wise alteration in the applied voltage waveform.

7. The liquid crystal light variable device of claim 1, wherein the liquid crystal material has a thickness to pitch ratio (d/p) of less than 1.5.

8. The liquid crystal light variable device of claim 1, wherein the liquid crystal material has a birefringence greater than or equal to 0.04 nm.

9. The liquid crystal light variable device of claim 1, wherein the device in the low-haze low-tint state has a light transmission that is greater than or equal to 40%.

10. The liquid crystal light variable device of claim 1, wherein the device in the low-haze high-tint state has a light transmission of less than or equal to 30%.

11. The liquid crystal light variable device of claim 1, wherein a haze value of the device in the low-haze low-tint or low-haze high-tint state is less than or equal to 10%.

12. The liquid crystal light variable device of claim 1, wherein a haze value of the device in the high-haze high-tint state is greater than or equal to 15%.

13. The liquid crystal light variable device of claim 1, wherein the device has one or more regions each having a liquid crystal cell according to claim 1, wherein each region is operated independently and can transition from one state to another independently of the other regions.

14. The liquid crystal light variable device of claim 1, wherein a portion of the device is used as a display.

15. A method of altering light transmission of a device, comprising:
    operating a liquid crystal light variable device according to claim 1,
    applying a first voltage waveform to the optic device to achieve a CLEAR state,
    applying a second voltage waveform to the optic device to achieve a TINTED state, and
    applying a third voltage waveform to the device to achieve an OPAQUE state.

16. The method of claim 15, wherein the first voltage waveform is from zero voltage to a first voltage threshold.

17. The method of claim 15, wherein the second voltage waveform is from zero voltage to a second voltage threshold.

18. A variable light transmissive device comprising: a first substrate with a first conductive layer disposed thereon; a second substrate with a second conductive layer disposed thereon; a polymer-free liquid crystal-dichroic dye mixture having ionic impurities disposed between the first and second conductive layers; a power supply configured to provide predetermined voltage waveforms of variable predetermined voltage and frequency to the first and second conductive layers;
    wherein the liquid crystal-dichroic dye mixture align substantially perpendicular to the first and second substrates to achieve a low-haze, low-tint state upon application of a first voltage waveform;
    wherein the liquid crystal-dichroic dye mixture align substantially parallel to the first and second substrates to achieve a low-haze, high-tint state upon application of a second voltage waveform; and
    wherein the liquid crystal-dichroic dye mixture substantially undergoes dynamic scattering to achieve a high-haze high-tint state upon application of a third voltage waveform.

19. The light transmissive device of claim 18, wherein the light transmissive device is configured to display an image.

20. The light transmissive device of claim 18, wherein the device has a split-screen configuration having two or more regions, each region having a separate power supply and capable of operating in one of said low-haze low-tint, low-haze-high-tint, or high-haze high-tint states independently of any other region.

* * * * *

UNITED STATES PATENT AND TRADEMARK OFFICE
CERTIFICATE OF CORRECTION

| | | |
|---|---|---|
| PATENT NO. | : 9,116,370 B2 | Page 1 of 1 |
| APPLICATION NO. | : 13/889209 | |
| DATED | : August 25, 2015 | |
| INVENTOR(S) | : Taheri et al. | |

It is certified that error appears in the above-identified patent and that said Letters Patent is hereby corrected as shown below:

IN THE CLAIMS

In Column 15, line 48 (Claim 3, line 1) the number "1" should read --2--;
In Column 15, line 51 (Claim 4, line 1) the number "1" should read --2--.

Signed and Sealed this
Twenty-second Day of March, 2016

Michelle K. Lee
*Director of the United States Patent and Trademark Office*